United States Patent [19]

Hnizdor

[11] Patent Number: 5,524,380
[45] Date of Patent: Jun. 11, 1996

[54] FINNED ARTIFICIAL FLY

[76] Inventor: Thomas A. Hnizdor, 9164 Brady, Redford, Mich. 48239

[21] Appl. No.: 260,888

[22] Filed: Jun. 16, 1994

[51] Int. Cl.⁶ ................................. A01K 85/00
[52] U.S. Cl. ........................ 43/42.47; 43/42.37
[58] Field of Search ................ 43/42.37, 42.45, 43/42.47, 42.22, 42.26, 42.27

[56] References Cited

U.S. PATENT DOCUMENTS

| | | | |
|---|---|---|---|
| 779,083 | 1/1905 | Jamison | 43/42.37 |
| 1,323,458 | 12/1919 | Dills . | |
| 1,385,627 | 7/1921 | Lane | 43/42.45 |
| 1,415,913 | 5/1922 | Auberlin | 43/42.37 |
| 1,430,642 | 10/1922 | Gross . | |
| 1,457,926 | 6/1923 | Dunkelberger | 43/42.47 |
| 1,555,029 | 9/1925 | Russell . | |
| 1,581,833 | 4/1926 | Bonnett | 43/42.47 |
| 1,635,644 | 7/1927 | Sloan . | |
| 1,787,733 | 1/1931 | Pagin . | |
| 2,178,301 | 10/1939 | Grant . | |
| 2,231,949 | 2/1941 | Rinehart . | |
| 2,516,039 | 7/1950 | Wysack | 43/42.37 |
| 2,754,612 | 7/1956 | Means . | |
| 2,800,740 | 7/1957 | Glaze . | |
| 2,878,612 | 3/1959 | Netherton et al. | 43/42.47 |
| 2,958,152 | 11/1960 | Kyper | 43/42.47 |
| 3,296,734 | 1/1967 | Johnson . | |
| 3,367,060 | 2/1968 | Abercrombie . | |
| 3,483,651 | 12/1969 | Borger . | |
| 3,605,317 | 9/1971 | Pobst . | |
| 3,959,060 | 5/1976 | Jones . | |
| 4,163,337 | 8/1979 | Kress . | |
| 4,380,884 | 4/1983 | Pond . | |
| 4,437,257 | 3/1984 | Kluge . | |
| 4,835,898 | 6/1989 | Pond . | |
| 4,959,920 | 10/1990 | Walker | 43/42.47 |
| 4,965,957 | 10/1990 | Hnizdor . | |
| 5,097,621 | 3/1992 | Hnizdor . | |

OTHER PUBLICATIONS

Fly Fisherman, May 1986, "Flies or Lures", John Gierach, p. 73.

Primary Examiner—Jack W. Lavinder
Assistant Examiner—James Miner
Attorney, Agent, or Firm—Young & Basile

[57] ABSTRACT

A buoyant body has a hook extending outward from one end and a pair of rigid fins mounted on and extending angularly outward from opposite sides of the body. The fins are identically constructed and symmetrically mounted on the body. Each fin is oriented on the body such that one major surface is disposed at an angle with respect to a shank of the hook extending through the body. Further, the fins are oriented such that the first and second side edges of each fin are disposed at an angle with respect to a vertical plane extending through the shank of the hook.

9 Claims, 1 Drawing Sheet

FINNED ARTIFICIAL FLY

BACKGROUND OF THE INVENTION

1. Field of the Invention

The present invention relates to artificial flies and/or lures for use in fishing.

2. Description of the Art

Artificial flies and lures are widely used in the sport of fishing as they have proven to be excellent attractors for a large number of varieties of fish. In the case of artificial flies, a fly simulating a natural fly, insect or small bait fish is mounted on a hook. Such flies may comprise a buoyant body, feathers, etc.

Due to the light weight of such flies, particularly since the flies are formed of buoyant materials, the artificial flies typically float on the water surface or at most one to two inches below the surface depending upon the water current. In order to position the fly at deeper depths, weights have been employed either on the fly or on the line attached to the fly to lower the fly to depths ranging from one foot or more below the water surface. However, the additional weights added to the fly make casting of the fly more difficult and can interfere with the action or movement of the fly in the water where it is desirable to have the fly move in the same manner as an insect.

It is known to form artificial flies and/or lures with fins simulating the pectoral fins on small bait fish. However, such fins have been typically formed of feathers or other lightweight, flexible elements and serve only to simulate a naturally occurring small bait fish rather than performing any useful function in controlling the movement of the artificial fly in the water.

Thus, it would be desirable to provide an artificial fly and/or lure which is capable of diving to deeper depths in the water without the use of additional lead weights or heavier hooks. It would also be desirable to provide an artificial fly and/or lure which is capable of diving to deep depths in the water but which still has a light weight for ease of casting and movement in the water. It would also be desirable to provide an artificial fly and/or lure which is capable of maintaining a horizontal orientation below the water surface in the same manner as that of a natural small bait fish for increased attraction to a fish.

SUMMARY OF THE INVENTION

The present invention is a finned artificial fly which includes a buoyant body mounted over the shank of a hook. A bend on the hook extends outward from one end of the shank and the body and terminates in a point spaced from the body. First and second fins are mounted on and extend angularly outward from opposite sides of the body, preferably adjacent the front end of the body near the eye of the hook. The first and second fins have an identical shape, and symmetrical mounting position and orientation on the body. Each of the first and second fins has first and second opposed major surfaces, first and second opposed ends, and first and second opposed side edges extending between the first and second ends. The first end of each of the first and second fins is fixedly mounted on the body at an angle with respect to the shank such that the first side edge of each fin is disposed at a first angle with respect to a vertical plane extending through the shank and the second side edge of each of the fins is disposed at a second angle, identical to the first angle, with respect to the vertical plane extending through the body.

Preferably, the first and second fins are formed of a rigid, lightweight material.

First and second open ended slots or grooves are formed in opposite sides of the body. The first and second slots receive the first ends of the first and second fins, respectively. Means are provided for fixedly mounting the first and second fins in the first and second slots. Although the mounting means may comprise a suitable adhesive, in a preferred embodiment, the mounting means is an epoxy or lacquer coating which is applied over the entire body.

The finned artificial fly of the present invention provides a artificial fly which is uniquely capable of diving to deeper depths below the water surface without the need for lead weights or heavier hooks. This enables the artificial fly of the present invention to be easily cast as well as being capable of movement in the water which closely simulates the natural movements of small bait fish to provide increased attraction to a fish.

The length of the fins between the first and second ends thereof can be shortened to suit the particular fishing conditions in which the finned artificial fly is utilized. For example, the fins can be left at a long length for use in slower currents. When the finned artificial fly is to be used in faster currents, the length of each fin between the first and second ends can be shortened.

The finned artificial fly of the present invention is capable of diving below the water surface, such as from one to two feet below the water surface, solely in response to the action of the water current on the angularly disposed fins. Without the fins, the surface tension of the water will typically maintain previously devised artificial flies either directly on the water surface or at most one to three inches below the water surface.

Finally, the fins used in the finned artificial fly of the present invention maintain the artificial fly in a substantially horizontal orientation after casting and during diving below the water surface as well as when the artificial fly is being reeled in by the fishermen.

BRIEF DESCRIPTION OF THE DRAWING

The various features, advantages and other uses of the present invention will become more apparent by referring to the following detailed description and drawing in which.

Figure 1:
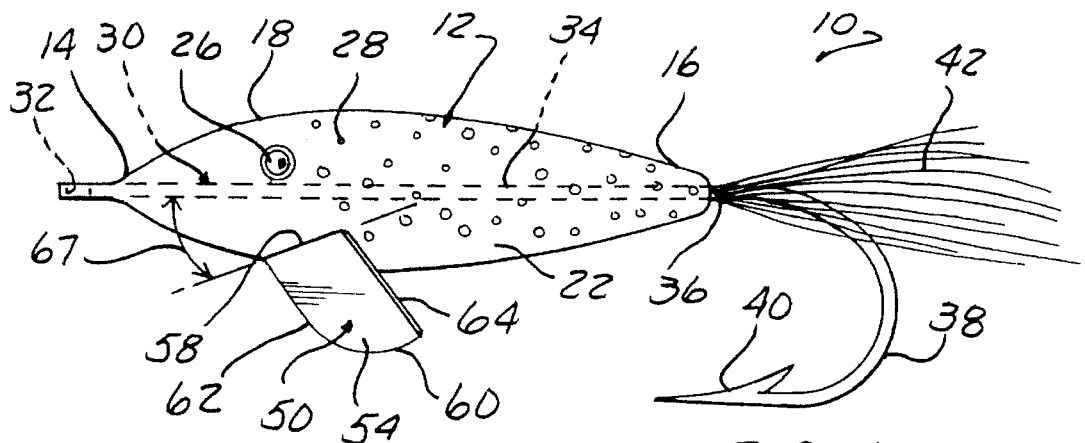
FIG. 1 is a side elevational view of a finned artificial fly constructed in accordance of the teachings of the present invention.

Referring now to the drawing, and to FIGS. 1–3 in particular, there is depicted an artificial fly/lure 10, hereinafter referred to simply as an artificial fly.

The artificial fly 10 includes a fly element or body 12 which may have any suitable shape to simulate any naturally occurring insect, such as a fly, as well as a small bait fish. Thus, it will be understood that the shape of the fly element or body 12, shown in FIG. 1, is by way of example only. Specifically, the body 12 is formed of a suitable lightweight, buoyant material, such as polystyrene, balsa wood, cork, etc. The body 12 has an aerodynamic or bullet shape with a front end or nose 14, an opposed rear or tail end 16, a top or back 18, and a bottom 20. Opposed sides 22 and 24 are also formed on the body 12. The top 18, the bottom 20, and the opposed sides 22 and 24, in a preferred embodiment, smoothly taper from the front end 14 to the rear end 16 in an aerodynamic shape.

Various designs or patterns may be placed on the body 12 to simulate patterns found on naturally occurring small bait fish. A pair of eyes 26 may be placed on the body 12 at a suitable location adjacent the front end 14 thereof. The body 12 may also be painted in any suitable color similar to the color of naturally occurring bait fish. Finally, as is conventional, an outer protective coating, such as a coating formed of an epoxy or lacquer, is disposed over the entire exterior surface of the body 12.

A hook denoted generally by reference number 30 is disposed generally centrally within the body 12. The hook 30 includes an eye 32 protruding outward from the front end 14 of the body 12. An elongated, generally planar shank 34 extends from a first end at the eye 32 through the body 12 to a second end 36 protruding outwardly from the rear end 16 of the body 12. A bend 38 extends integrally from the second end 36 of the shank 34 and terminates in a point 40 which is spaced from the body 12. It will be understood that the bend 38 and the point 40 may take the shape of any conventional bend and point typically found on fishhooks.

Figure 3:
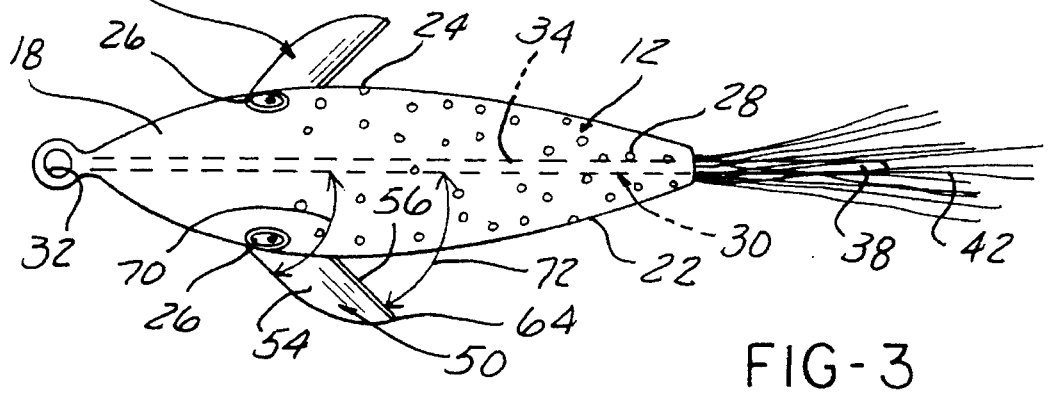
FIG. 3 is a plan view of the finned artificial fly shown in FIG. 1.

Finally, by way of example only, the artificial fly 10 is dressed with suitable tail feathers 42 which are attached to the rear end 16 of the body 12 and extend outward from the body 12 and cover an upper portion of the bend 38, as shown in FIGS. 1 and 3.

Figure 2:
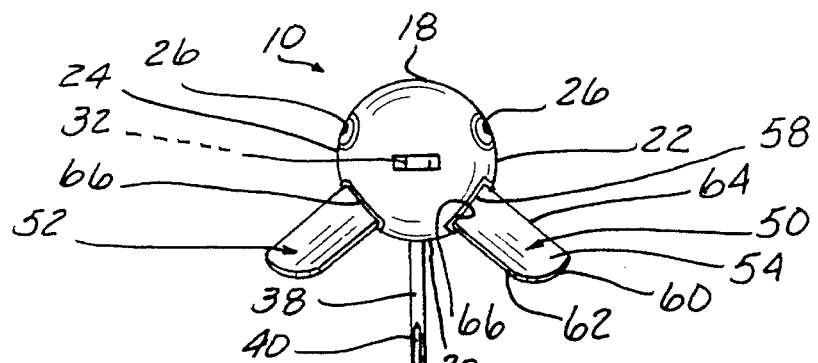
FIG. 2 is a front end view of the finned artificial fly shown in FIG. 1.

As also shown in FIGS. 1–3, first and second fins 50 and 52, respectively, are fixedly mounted on and extend angularly outward from the opposite sides 22 and 24 of the body 12. The fins 50 and 52 have an identical size and shape and are mounted in symmetrical mounting positions and angular orientation on the body 12.

The fins 50 and 52 are formed of a lightweight material, such as a suitable plastic, balsa wood, cork, etc. Further, although it is preferred that the fins 50 and 52 be formed of a somewhat rigid material, the fins 50 and 52 can have a small amount of flex without detracting from their function described hereafter.

As each of the fins 50 and 52 are identically constructed, the following description of the various elements of the fin 50 will also be understood to apply equally to the opposite fin 52.

The fin 50 has a generally planar shape and is formed with a relatively thin thickness. The fin 50 is formed with first and second major, opposed surfaces 54 and 56. Further, the fin 50 has a first end 58, an opposed second end 60 and first and second side edges 62 and 64, respectively. The first and second side edges 62 and 64, respectively, extend between the first and second ends 58 and 60.

The second end 60 of each fin 50 and 52 by example only has a generally curved or arcuate shape and extends smoothly into the first side edge 62 as shown in FIGS. 1–3.

According to the present invention, the first and second fins 50 and 52 are disposed at an angular orientation with respect to the body 12 so as to extend obliquely from the body 12 in any viewing orientation. This is achieved by fixedly mounting the first ends 58 of each of the fins 50 and 52 in open ended grooves 66 formed on opposite sides of the body 12, generally near the bottom 20 of the body 12 and spaced a short distance from the eye 32 of the hook 34. Further, the first ends 58 of each of the fins 50 and 52 mounted in the grooves 66 are disposed at an angle 67 shown in FIG. 1 with respect to the shank 34 extending through the body 12 such that a front edge of the first end 58 is disposed generally lower on the body 12 from the shank 34 than the opposite rear edge between the planar extent of the first end 58 and the second side edge 64. This angular arrangement of the first ends 58 of the fins 50 and 52 places the first side edge 62 of each of the fins 50 and 52 at a first angle denoted by reference number 70 in FIG. 3 with respect to a vertical plane extending through the shank 34. Also, the angular orientation of the first end 58 of each of the fins 50 and 52 places the second side edge 64 at a second angle, identical to the first angle of the first side edge 62, with respect to the vertical plane extending through the shank 34 of the body 12.

This angular orientation of the fins 50 and 52 places the first side edge 64 of each of the fins 50 and 52 farther forward on the body 12 than the second side edge 64 as shown in the plan view of FIG. 3. Further, this angular arrangement of the first major surface 54 of each of the fins 50 and 52 creates resistance as water flows past the body 12 and over the fins 50 and 52 and causes the body 12 to automatically dive to a predetermined depth below the water surface without the need for additional weights, heavier hooks, etc., as previously employed in artificial flies or lures.

Depending upon the magnitude of the water current in which the finned artificial fly 10 is to be used, the length of the fins 50 and 52 may be altered to cause the finned artificial fly 10 to automatically dive to a predetermined depth below the water surface. In slower currents, the fins 50 and 52 may be left at a predetermined long length shown in FIGS. 1–3. With this length, the finned artificial fly 10 will dive below the water surface to depths of approximately one to two feet. In faster currents, the fins 50 and 52 may be shortened by trimming of a portion of the second end 60 of each fin 50 and 52. It is important that each fin 50 and 52 be shortened exactly the same amount so that the fly 10 remains stable in the current without spin or revolving.

Figure 4:
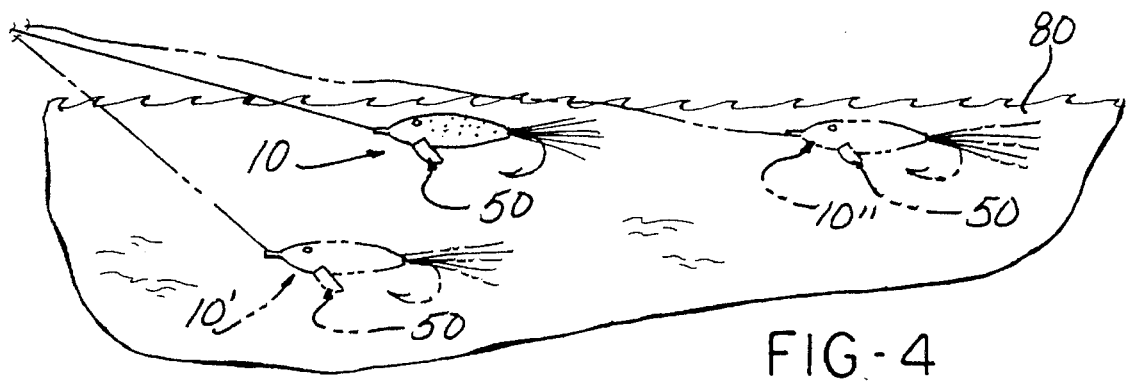
FIG. 4 is a pictorial representation of the orientation of the finned artificial fly of the present invention as it dives below the water surface after casting and as it is being reeled in by a fisherman.

FIG. 4 depicts the action of the finned artificial fly 10 of the present invention after it is cast into the water. After the fly 10 is cast into the water, the angularly extending fins 50 and 52 provide an angled surface which interacts with the water flowing past the fly 10 to cause the fly 10 to dive from a first position near the water surface 80 to a predetermined depth below the water surface as shown in phantom in FIG. 4. This depth is approximately one to two feet below the water surface 80, by way of example only. During this diving to the predetermined depth below the water surface 80, the finned artificial fly 10 due to the symmetrical orientation of the fins 50 and 52, remains in a generally horizontal orientation with respect to the water surface and the current flowing past the fly 10. This horizontal orientation is preferred as it more closely simulates the actual position assumed by a small bait fish in the water. Further, the symmetrical orientation of the fins 50 and 52 ensures that the artificial fly 10 remains in a generally stable, horizontal orientation without rotating or otherwise revolving about an axis extending through the shank 34.

If the fisherman deploys slack in the fly line 11, the fly 10 will float upward toward the water surface 80 from the position shown in phantom in FIG. 4 to a position shown by reference number 10" adjacent the water surface 80 due to the buoyancy of the body 12. During this upward movement, the fly 10 remains in a generally horizontal orientation without spinning while gaining downstream distance. In this position, the fly 10" is ideally placed for an immediate back cast.

If the fisherman reels the fly 10 in toward himself, the fins 50 and 52 maintain the fly 10 horizontal and at the deep depth until the fly 10 is directly below the end of the fly rod.

In summary, there has been disclosed a unique finned artificial fly which automatically dives to predetermined depths below a water surface without the need for additional weights, heavier hooks, etc., as employed in previously used with artificial flies. Further, this automatic diving feature is achieved without additional weight thereby maintaining the easy castability of the artificial fly of the present invention. Further, the unique symmetrical orientation of the fins on the finned artificial fly of the present invention maintains the artificial fly in a stable, horizontal orientation when in the water without any spinning or rotation about an axis extending through the shank. This more closely simulates the normal position assumed by a small bait fish so as to cause the finned artificial fly of the present invention to act as an excellent attractor to fish.

What is claimed is:

1. An artificial fly comprising:

a hook including a shank and a bend extending from one end of the shank and terminating in a point;

a body mounted over the shank, the bend extending outward from one end of the body; and first and second fins mounted on and extending angularly outward and downward from opposite sides of the body, the first and second fins having an identical shape, and symmetrical mounting position and orientation on the body, each of the first and second fins having first and second opposed major surfaces, first and second opposed ends and first and second opposed, generally planar side edges extending generally in parallel between the first and second ends;

the first end of each of the first and second fins fixedly mounted on the body at an acute angle with respect to the shank extending through the body such that the first and second fins extend rearwardly and upwardly from the first side edge to the second side edge.

2. The artificial fly of claim 1 wherein:

the first and second fins are formed of a rigid material.

3. The artificial fly of claim 1 wherein:

the first and second fins have a generally planar shape between the first and second ends and the first and second side edges.

4. The artificial fly of claim 1 wherein:

first and second open ended slots are formed in opposite sides of the body, the first and second slots respectively receiving the first ends of the first and second fins.

5. The artificial fly of claim 4 further comprising:

means for fixedly mounting the first ends of the first and second fins in the first and second slots, respectively.

6. The artificial fly of claim 1 wherein:

the shank, the bend, and the point of the hook lie in a common plane.

7. The artificial fly of claim 1 wherein the body is formed of a buoyant material.

8. The artificial fly of claim 1 wherein:

the first and second fins are mounted on the body adjacent one end of the body, opposite from the end from which the bend extends.

9. The artificial fly of claim 1 wherein:

a corner between the first side edge and the second end of each of the first and second fins has an arcuate shape.

\* \* \* \* \*